United States Patent [19]
Long et al.

[11] Patent Number: 5,550,982
[45] Date of Patent: Aug. 27, 1996

[54] VIDEO APPLICATION SERVER

[75] Inventors: James E. Long, Palo Alto; Joseph M. Gang, Jr.; Charles J. Bedard, both of Saratoga; Randall B. Baird; David A. Edwards, both of San Jose, all of Calif.

[73] Assignee: Starlight Networks, Mountain View, Calif.

[21] Appl. No.: 82,227

[22] Filed: Jun. 24, 1993

[51] Int. Cl.$^6$ ............................................. G06F 13/42
[52] U.S. Cl. ............................................. 395/200.13
[58] Field of Search ............................ 358/403, 433; 382/56, 61, 305, 307; 395/200.15, 200.13

[56] References Cited

U.S. PATENT DOCUMENTS

| | | | |
|---|---|---|---|
| 4,792,849 | 12/1988 | McCalley et al. | 348/7 |
| 4,816,905 | 3/1989 | Tweedy et al. | 348/7 |
| 5,208,665 | 5/1993 | McCalley et al. | 348/12 |
| 5,262,875 | 11/1993 | Mincer et al. | 358/335 |
| 5,361,261 | 11/1994 | Eden et al. | 370/85.3 |
| 5,408,465 | 8/1995 | Gusella et al. | 370/17 |
| 5,442,749 | 8/1995 | Northcutt et al. | 395/200.15 |

OTHER PUBLICATIONS

"Starworks™—A Video Application Server", Fouad A. Tobagi, Joseph Pang, Starlight Networks, Inc., Mountain View, California 94041, Compcon '93, San Francisco, Feb. 22–25, 1993.

"Starworks™—Video Application Server Software", Fouad Tobagi, Starlight Networks, Inc., Mountain View, California 94041, Compcon '93, Feb. 23, 1993.

Primary Examiner—Richard L. Ellis
Attorney, Agent, or Firm—Meltzer, Lippe, Goldstein, et al.

[57] ABSTRACT

A local area network for supporting video applications comprises a transmission medium, one or more data file servers connected to the transmission medium for supporting data applications in the local area network, a dedicated video server for supporting video applications in the local area network and one or more clients connected to the local area network. The server includes software for managing multiple simultaneous video streams transmitted across the LAN. The client includes software for accessing the dedicated video server across the LAN to transmit video to the server or receive video from the server.

16 Claims, 4 Drawing Sheets

VIDEO APPLICATION SERVER

RELATED APPLICATION

A patent application entitled METHOD OF OPERATING A DISK STORAGE SYSTEM has been filed for Fouad A. Tobagi, Joseph M. Gang, Jr., Randall B. Baird, Joseph W. M. Pang, and Martin J. McFadden on Nov. 17, 1992, bears Ser. No. 07/977,493 and is assigned to the assignee hereof. The above-identified application contains subject matter related to the present application and is incorporated herein by reference.

FIELD OF THE INVENTION

The present invention relates to a local area network which provides digital video applications. In particular, the present invention relates to a dedicated server for supporting video applications in a local area network.

BACKGROUND OF THE INVENTION

The demand for networked digital audiovisual systems is expected to grow considerably over the next few years, as businesses, government and other institutions increasingly turn to digital networks to distribute audiovisual information for education, presentations and reference applications. These customers expect systems that will allow a number of people to be able to view audiovisual information from a server simultaneously, while fully retaining their other network functions. For example, in business computing, most of the major productivity software developers see networked video as an effective means of training and supporting users. Many of these developers have begun including VHS videotapes for training with their software. Now they want to take this a step further by linking the video directly to their software's on-line help resources. Centralizing that support in a video server reduces the cost for customers with many users and ensures that it is properly maintained by the MIS department or other responsible.

Networked video presentation systems in business can allow corporate resources, such as sales videos, employee information, and video-based training to be available immediately to all employees from their desks. Similarly, networked video documentation systems will allow institutions of all kinds to maintain multi-user audiovisual databases. The largest population of users of such systems are likely to be health care institutions which have extensive audiovisual records. Such databases can be used for on-the-job reference such as revisiting a complex procedure on the manufacturing floor, or creating on-line archives of TV commercials for an advertising agency.

Video teleconferencing is a fast growing segment in the communications arena. However, most of today's video teleconferencing installations are dedicated, standalone facilities set aside for that purpose. While the price tag for such systems is dropping, it remains an expensive facility that needs to be shared. Extending these services to the desktop over local area networks will make video teleconferencing services more widely available at a lower cost.

Finally, the ultimate goal is computer-supported collaboration, whereby users at different locations will be able to share data and files and work on problems simultaneously using multimedia workstations linked by local-and wide-area networks. Users of such desktop conferencing systems will be able to access stored video and audio from a central server, hold conferences with remotely based colleagues via the PCs on their desks and work simultaneously with them on files in a shared electronic workspace.

These examples clearly show that the support of digital video services must include the communication of video information over digital networks.

The characteristics of files, file access and network traffic in digital video applications differ substantially from those encountered in data applications.

With data applications, whenever a user makes a file access request to a server, or requests that data be transmitted on a network, the user expects a fast response time—fast compared to the time it takes it to place the next request. As a result, the capacity of a server and the overall network bandwidth must both be large compared to the average demand placed by a single user. Accordingly, the design of a file server aimed at supporting data applications and the design of a network to support data traffic have been based on the principle of bandwidth sharing and statistical time multiplexing. For example, local area networks of the Ethernet type (10 Mbits/s) and of the token-ring type (4 and 16 Mbits/s) serving tens to hundreds of users have proliferated. File servers have furthermore taken advantage of the property of locality in file access, and incorporated appropriate caching mechanisms. In all cases, as the overall load placed on the shared resources increased, the average response time experienced by all users also increased.

Let us examine now digital video. A video signal is analog in nature and continuous over time. It is digitized by first sampling it at regular intervals, and then by quantizing each sample. This digitization process results in a data stream which is of relatively constant and very high rate; (NTSC signals result in data rates in the neighborhood of 100 Mb/s, and an HDTV signal, 600 Mb/s.) However, given that the sampled data exhibits a great deal of redundancy, compression is applied, thus significantly reducing the stream's rate. Depending on the bandwidth of the original analog signal, the sampling rate, the quantization step size, the encoding method, and the desired image quality, the resulting data rate for a digital video signal can range from 64 Kb/s to tens of Mb/s. For example. CCITT Recommendation H.261 specifies video coding and decoding methods for audio visual services at the rate of p×64 Kbits/s, where p is in the range of 1 to 30 (i.e., 64 Kb/s to 2 Mb/s); Intel's DVI video streams have a data rate of 1.2 Mbits/s; the MPEG standard specifies a coded representation that can be used for compressing video sequences to bit rates around 1.5 Mbits/s, and its successor, known as MPEGII, is currently under development to provide a wider range of functionality and image quality at rates in the range of 4 to 8 Mbits/s. Advances in compression techniques and in their VLSI circuit implementations are among the important reasons why video services over LANs are becoming practical.

Two important observations may be made. The first is that the volume of bits corresponding to a digitized video segment of useful duration (even compressed) is large. A ten minute DVI video segment requires 90 Mbytes of storage; ten hours require over 5 Gbytes. Thus video servers where shared video information is to be stored must have relatively large storage capacity.

The second observation is that the communication of digital video data between two nodes on the local area network (a server and a desktop station, or two desktop stations) requires that data be transmitted in a stream fashion. This means that data packets must be delivered to the destination on time, and failure to deliver data on time would result in video quality degradation. (This characteristic has earned this type of traffic the attribute synchronous or isochronous.) This has two main implications: (i) from a network's point of view, one requires the availability, on a continuous basis, of a bandwidth at least equal to the signal's data rate; (note that the data rate associated with a digitized video signal, even compressed, is larger than the average traffic rate for a typical data application user;) (ii) from a file and storage system point of view, one requires streaming capabilities which guarantee the continuity of each stream being retrieved or stored. Thus, in order to support multiple independent video signals, the network must have necessary aggregate bandwidth as well as means to guarantee the bandwidth required for each video signal, and the file and storage system must be of the streaming type and must have a capacity sufficient to handle all video streams. By the same token, there is a maximum number of Video streams of a given data rate that a network and a server can support, and means must exist to prevent additional requests from overloading the system. While in data applications an overload results in higher response time, with video applications, any additional load beyond the maximum possible would result in degraded video quality.

It is thus clear that the characteristics of video traffic differ substantially from those of traditional data traffic to the point that servers and local area networks designed primarily to support data applications are not appropriate to effectively support video services. New capabilities in servers and networks must be offered.

There are three basic approaches to the design of servers aimed at supporting multimedia applications. One approach is to retrofit a file server in such a way as to allow it to handle video traffic; for example, a Novell file server may be equipped with a "Netware loadable module" which provides the streaming capability needed for video. While it is expected that with this approach a single server can support both video and data applications simultaneously, the performance may be compromised for both. Another approach is to design a fully integrated server which is capable of both transactional data and streaming video services in a well coordinated and dynamically optimized fashion. While this approach may make good sense in the future, for the time being, it cannot be entirely justified. A third approach is to design a server entirely dedicated to video applications; such a server is then designed and optimized specifically for streaming, and can thus offer the best performance in video service; to support both video and data services simultaneously, such a video server is to coexist and interoperate with one or more data file servers. To achieve the best performance at the lowest price, and to take the most advantages of existing data applications servers (e.g., data base servers), this last approach is by far the most sensible one.

Accordingly, it is an object of the present invention to provide a local area network including such a dedicated video server for supporting video applications.

SUMMARY OF THE INVENTION

In accordance with the present invention, a local area network for supporting video applications comprises a transmission medium, one or more data file servers connected to the transmission medium for supporting data applications in the local area network, one or more dedicated video servers connected to the transmission medium for supporting video applications in the local area network, and one or more clients or user stations connected to the transmission medium.

The dedicated video server comprises a system bus to which a local memory and a CPU are connected. Also connected to the bus are a disk array for storing video streams, a video digitizer for digitizing externally generated (eog., live) analog video, a WAN card for interfacing with a wide area network (WAN) and a LAN interface which is connected with the transmission medium of the local area network.

The CPU of the server executes software including the following units: an RPC (Remote Procedure Call) agent receives remote procedure calls from the clients and decodes and translates them. A remote procedure call is a command transmitted by a client to the video server to access or modify video stream attributes. The Resource Reservation Manager is responsible for the admission of new streams to the network in response to client commands based on available system resources and previously made reservations for system resources. System resources include CPU capacity, memory, disk array I/O bandwidth and network bandwidth. The Stream Controller maintains the state of each stream and controls operation on the stream according to the current values of the stream attributes. It is also responsible for modifying the values of stream attributes in response to an RPC from a client.

The software executed by the video server CPU includes a memory manager. The memory manager provides sharing of the local memory among multiple streams and minimizes memory copies of bulk data.

The software executed by the CPU in the server also includes a plurality of I/O interfaces. A disk I/O interface manages video I/O between the disk array and the local memory. I/O interfaces are also provided for analog video feed and video transmitted on a WAN.

In case of live feed, the server may operate in a "tape loop mode", whereby it can store video data corresponding to the most recent period of time of a given length. The server also executes a transport protocol for the transmission of video data and associated commands over the local area network.

Typically the client is a desk top computer such as an IBM personal computer or Apple McIntosh. The client includes a bus to which is connected a CPU and a memory. Connected to the bus is a network interface card for interfacing with the transmission medium of the local area network. To display video the client includes conventional video display hardware and associated drives. In addition the client includes hardware or software for manipulating compressed video and for video decompression and compression. The client CPU executes video control software such as Microsoft Video for Windows™ or Quick time™ to manipulate and/or view video data belonging to one or more video streams. In addition, the client CPU executes video services interface software which permits the client to access digital video from the dedicated video server across the local area network. The software provides a set of movie and stream control functions which can be called by the user. The video services interface software translates the function calls into remote procedure calls. Typical video functions which can be called by the video services interface software include movie manipulation routines like open/close, play/stop/ record, read/write. As used herein, the word movie refers to an addressable object comprising any streaming type of data such as video or audio. A typical stream control function is connect/disconnect. Besides providing the necessary functionality for accessing digital video data over the LAN, the video services interface software coexists with other network software such as an existing network data transactional file system.

Communication between the client and server utilizes a transport protocol. The transport protocol transmits streams from the server to the client or from the client to the server. A stream connection is used to deliver data for each movie track. Illustratively, a movie may have more than one track and hence more than one stream associated with it. To access and modify movie and stream attributes, a client can send commands to the server by issuing remote procedure calls on a separate logical connection provided by the transport protocol.

In a preferred embodiment of the invention, a plurality of video servers can be controlled by data application servers on the network so that video services can be provided to specific clients from specific video servers in a manner that is transparent to users. For example, a user may be connected to a data base application server, in which a data base of movie titles is stored. The user accesses the data base application to make a selection for a movie to be played. Several scenarios may now be envisaged:

a) information about the selected movie (e.g., which server it is stored on, its identification, etc.) is sent back to the client, and the user (through the application program in the client) makes an explicit request to the designated server to play the selected movie. (In this case, the data base application server is used only to index movies).

b) communication between the data base application server and the client's application program takes place, whereby information about the selected movie is transferred, and then the application program in the client initiates the playback of the movie transparently to the user. It does so by opening a connection with the designated video server and by commanding the video server to provide the required video services. The user, however, may still control the movie service provided (such as pausing the playback of the movie, resuming, stopping, etc.).

c) the data base application server initiates the video service from the designated video server directly; in this case, several scenarios can be envisaged:

c1) the database server commands the video server to establish a connection between it and the client and initiates the video service.

c2) the database server establishes a connection between it and the video server, gets the video data to flow to the client via itself on the original connection established between the client and itself.

DETAILED DESCRIPTION OF THE INVENTION

Figure 1:
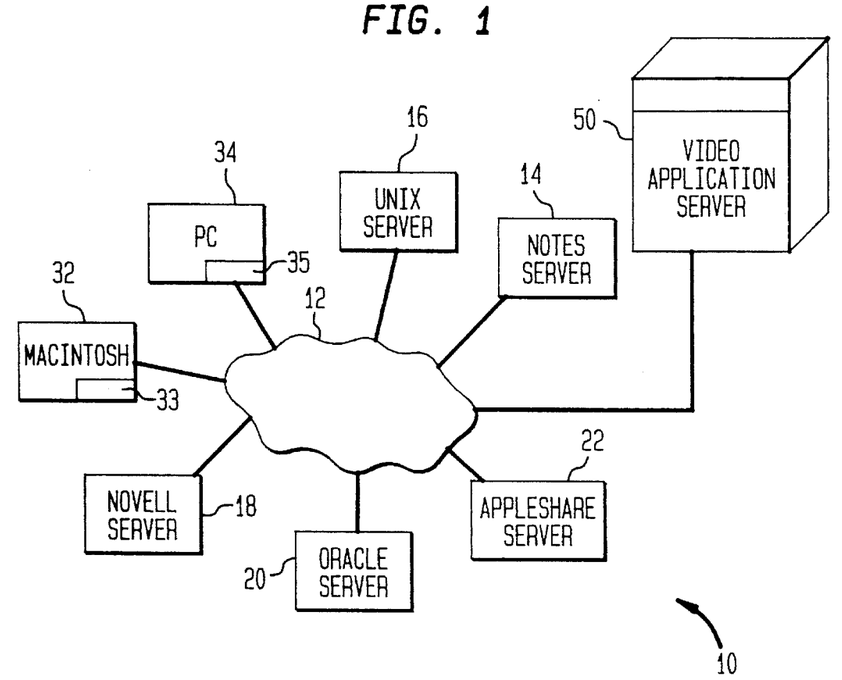
FIG. 1 schematically illustrates a local area network including a dedicated video server for supporting video applications and one or more clients in accordance with an illustrative embodiment of the invention.

FIG. 1 illustrates a local area network 10 in accordance with the present invention. The network 10 comprises a shared transmission medium 12. Illustratively, the shared transmission 12 may be implemented as an Ethernet or a token ring. A plurality of data file servers, such as the Lotus Notes™ Server 14, Unix server 16, Novell (Netware™) file server 18, Oracle Data Base server 20, and AppleShare server 22 are connected to the transmission medium 12. A dedicated video server 50 is also connected to the transmission medium 12. A plurality of clients, for example, the PC 34 and Macintosh 32 are also connected to the transmission medium 12. The dedicated video server 50 supports video applications in the network 10 which involves multiple simultaneous streams. A stream may be transmitted from the video server 50 to one or more clients, from a client to the video server 50, or from one client to another. The clients 32 and 34 include software, schematically illustrated as 33 and 35 to provide the functionalities for the client to access digital video data on the video server 50 across the network 10.

Figure 2:
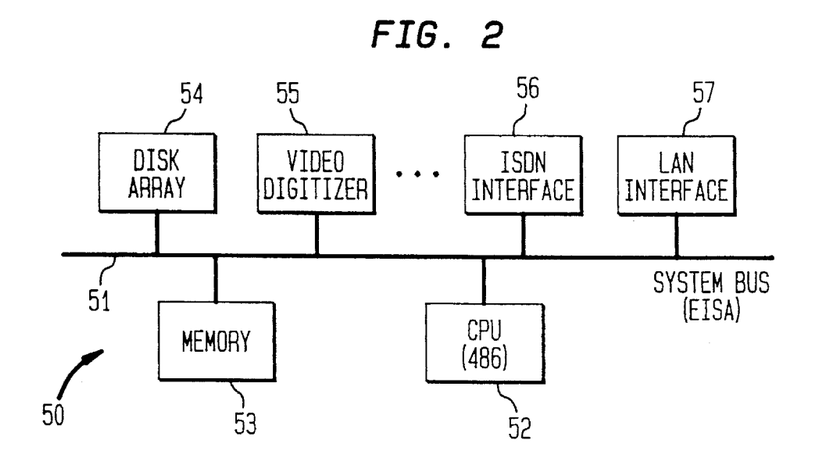
FIG. 2 schematically illustrates the hardware comprising the video server of FIG. 1.

FIG. 2 illustrates the major hardware components of the server 50. The server 50 comprises a system bus 51 which for example is an EISA bus. Connected to the system bus 51 are a CPU 52 and a local memory 53. The CPU is illustratively a 50 MHz 486 microprocessor. The amount of local memory required by the video server depends on the number of users and may equal 16 Mbytes. The server 50 also includes an SCSI-II disk array 54 for multi-access digital video storage. A video digitizer is provided for receiving externally generated (e.g., live) video and for digitizing this video. A WAN interface 56 interfaces the server 50 with a Wide Area Network (WAN). A LAN interface 57 interfaces the server 50 with the transmission medium 12 of the local area network 10 (see FIG. 1). Illustratively, the LAN interface 57 comprises multiple LAN cards (e.g., ethernet cards) to achieve the desired bandwidth.

Figure 3:
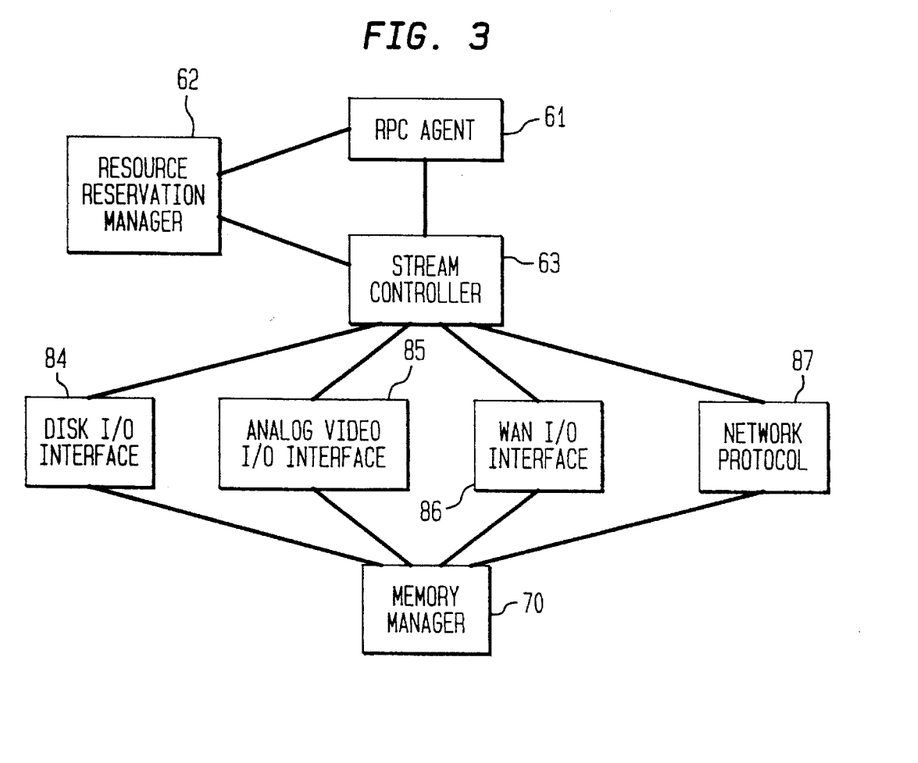
FIG. 3 schematically illustrates the software executed by the video server of FIG. 2.

A block diagram of the software executed in the server 50 is illustrated in FIG. 3. The server software comprises three main control units: the RPC (Remote Procedure Call) Agent 61, the Resource Reservation Manager 62 and the Stream Controller 63. The RPC agent 61 is responsible for servicing Remote Procedure Calls received from clients. The received Remote Procedure Calls are decoded and translated into internal function calls for use in the server software. The Resource Reservation Manager 62 is responsible for admitting new streams into the network based on available resources as well as previously made reservations. System resources include CPU capacity, memory, disk I/O bandwidth and network bandwidth. The stream controller 63 maintains the state of each stream and controls operations on each stream according to the current values of stream attributes. The stream controller 63 is also responsible for modifying the values of the stream attributes in response to Remote Procedure Calls received from a client. The stream attributes describe addressing, buffering, and connectivity characteristics of a stream. Stream attributes include: formats, identifications, source or destination, priority, maximum bandwidth, track statistics (e.g, size, number of disk array accesses, etc.)

Figure 3A:
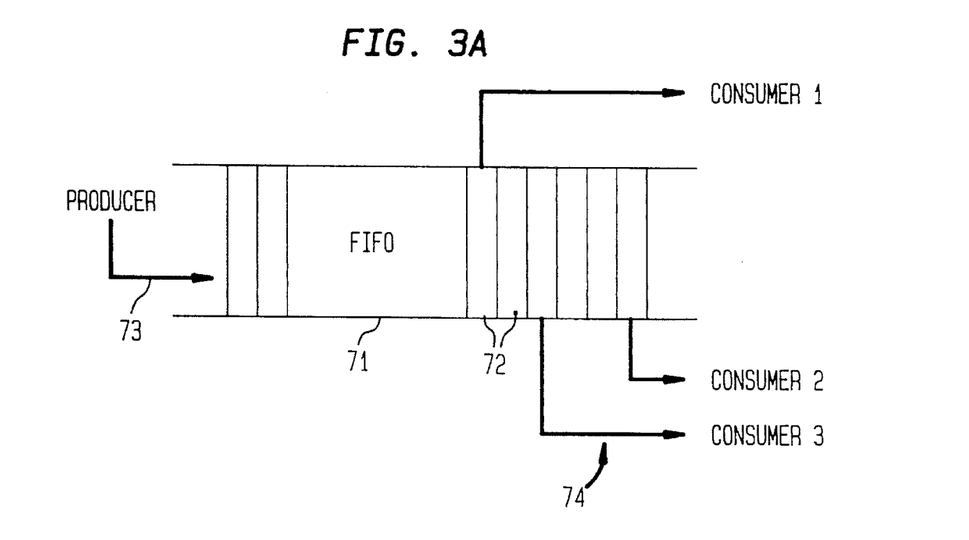
FIG. 3A schematically illustrates a memory manager comprising part of the software of FIG. 3.

The dedicated video server software as shown in FIG. 3 also includes a memory manager 70 for controlling the local memory 53 (see FIG. 2). The memory manager is shown in greater detail in FIG. 3A. The memory manager 70 provides efficient sharing of local memory 53 among multiple streams and minimizes memory copies of bulk data. The memory manager 70 makes use of one or more pipes. One pipe 71 is schematically illustrated in FIG. 3A. The pipe 71 is a linked list of memory chunks 72 that provide a logical FIFO queue. A producer 73 and one or more consumers 74 are associated with the pipe 71. The producer 73 puts data into the pipe and consumers 74 remove data from the pipe. For example, the producer may be a disk I/O interface and a consumer may be a stream connection to a client. The production/consumption state of the pipe is maintained by a number of producer/consumer pointers (not shown).

In the memory manager 70, the memory pool is partitioned into fixed sized chunks and multiple pipes are allowed to allocate free memory chunks on a demand basis. The chunk size is optimized for stored video applications. It is also possible to allow the chunk sizes used by the producer and one or more consumers to be different. For example, the chunk size used for disk I/O transactions may be larger than the packet size used by a network consumer to transmit data over the network.

The software of the video server 50 as illustrated in FIG. 3 also comprises a number of I/O interfaces to adapt to different forms of video I/O. Thus interface 84 is for video stored in the disk array 54. Interface 85 is for analog video feed and interface 86 is for video transmitted via a WAN. The interfaces 85 and 86 are entirely conventional. The disk I/O interface 84 is discussed in detail in the above-mentioned U.S. patent application Ser. No. 07/977,493.

In general, the disk I/O interface 84 operates as follows. The major design goal is to maximize the number of simultaneous streams while maintaining continuity requirements for each stream. For simplicity, consider the case where all streams are of fixed and equal rates, and that all I/Os are data retrievals from the disk array. A cyclic scheduling scheme may be utilized. In this scheme, time is divided into contiguous cycles of fixed length. Within a given cycle, a fixed amount of data is fetched from the disks in the disk array for each stream; the amount is determined by the product of the stream rate and the cycle length. Advantageously, this scheme satisfies the continuity requirement.

Under the cyclic scheduling scheme, the problem becomes that of maximizing the number of stream I/Os from the disk array within a cycle. The techniques of striping and sorting may be emphasized. Striping involves distributing the data being retrieved for each stream in a given cycle evenly across all disks in the disk array. This balances the load on all disks. Sorting involves ordering all the disk I/Os in a given cycle according to disk location among all streams. This minimizes the impact of long seek times.

The cycle length is an interesting design parameter. A long cycle length can increase the number of simultaneous streams but it also increases the memory requirement since memory usage is linearly proportional to the cycle length. Furthermore, long cycle length also implies a long startup latency for new streams.

The server 50 of FIG. 3 also includes software 87 for executing a network protocol for the transmission of streaming (e.g., video) data via the local area network. A protocol like the well known Express Transport Protocol (XTP) can be used for this purpose.

Figure 4:
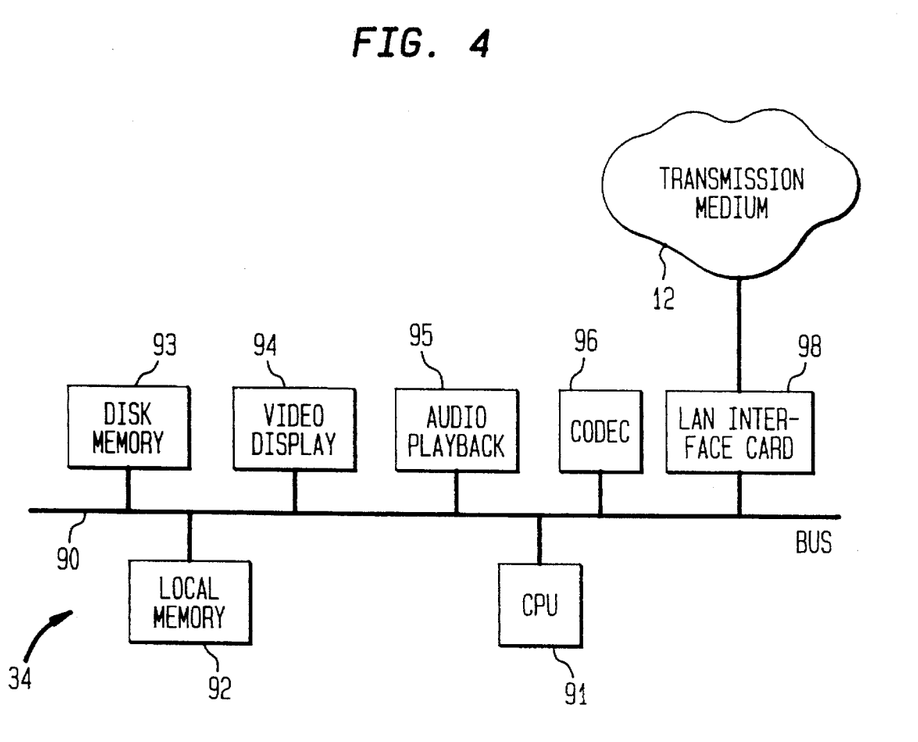
FIG. 4 schematically illustrates the hardware comparing a client connected to the local area network of FIG. 1.

The hardware contained in a client (e.g., client 34 of FIG. 1) is schematically illustrated in FIG. 4. The client 34 is an IBM compatible PC. As shown in FIG. 4, the client 34 comprises a bus 90. A CPU 91 and a local memory 92 are connected to the bus 90. A disk memory 93 is connected to the bus 90. The client includes video display hardware 94 and audio playback hardware 95. In addition, the client includes video compressing/decompressing hardware 96 for manipulating compressed video data. (Alternatively, video compression and/or decompression may be performed using software). A LAN card 98, which for example, may be an Ethernet card connects the client to the transmission medium 12 of the local area network.

Figure 5A:
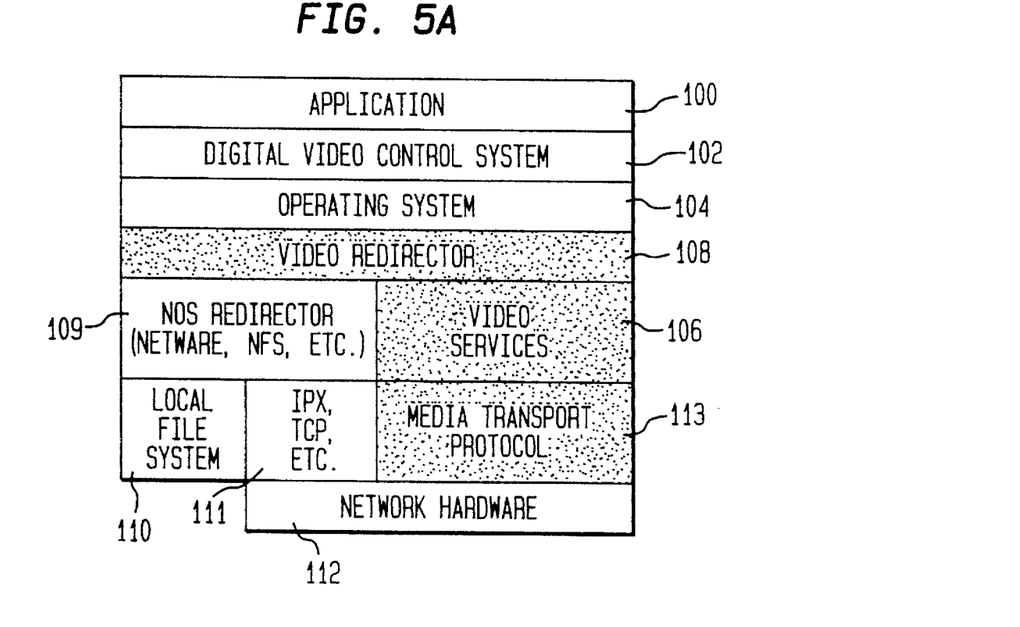
FIG. 5A and FIG. 5B schematically illustrate software executed by the CPU in the client of FIG. 4.
Figure 5B:
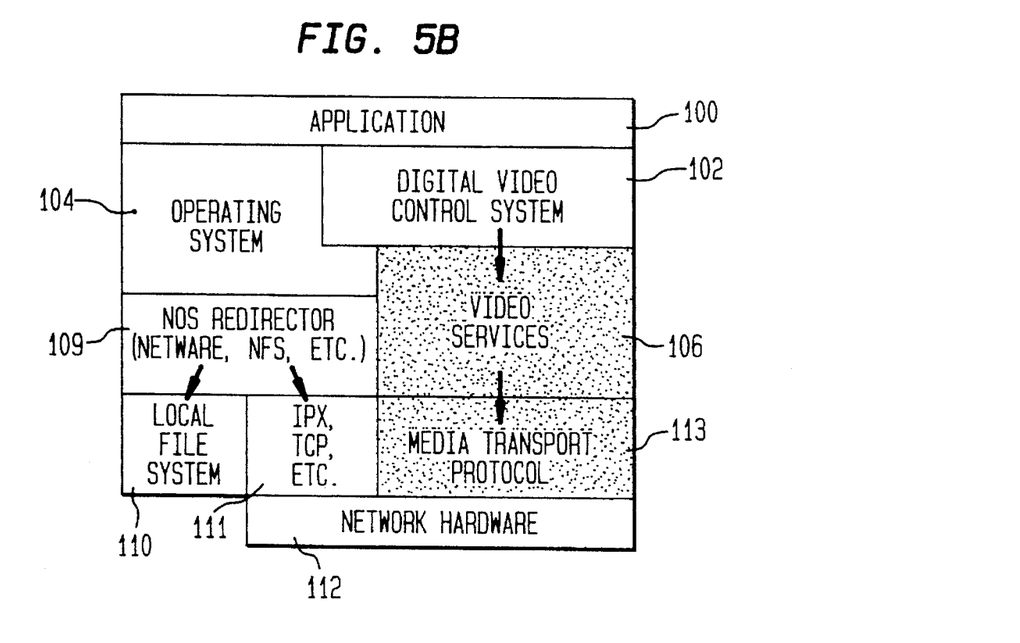

FIGS. 5A and 5B illustrate the software executed by the CPU 91 in the client 34 of FIG. 4. As shown in FIG. 5A the client software includes video applications and video player software 100 such as Microsoft MCI™. The digital video control system 102 manages video objects to provide a user interface to manipulate and/or view one or more movies. The digital video control system may for example be Microsoft Video for Windows™ or QuickTime™. The client software also includes an operating system 104 such as DOS or UNIX. In addition, the client executes video service interface software 106 which permits the client to access digital video from the dedicated video server across the local area network (see FIG. 1). This software provides a set of movie and stream control functions which can be called by the user. The video services interface software 106 translates the function calls into remote procedure calls. Typical video function which can be called by the video services interface software includes movie manipulation routines like open/close, play/stop/record, read/write. A typical stream function is connect/disconnect.

In FIG. 5A, the digital video control software 102 accesses the video services interface software 106 via the operating system 104. Thus, the software of FIG. 5A includes a video redirector 108. The video redirector 108 receives requests for video services and transactional data file requests from the operating system 104. The video redirector 108 separates the requests for video services from the transactional data file requests and directs the requests for video services to the video services interface software 106. The transactional data file requests are directed to a Network Operating System (NOS) redirector 109. This NOS redirector 109 directs the transactional data file requests to a local file system 110 located at the client or via a network protocol 111 and network interface hardware 112 to the data file server 14, 16, 18, 20, or 22 (see FIG. 1). The video service requests are processed by the video services interface software 106 which converts functional calls into remote procedure calls. The remote procedure calls are transmitted using the protocol 113 and network hardware 112 across the local area network 10 (see FIG. 1) to the server 50.

Thus, in FIG. 5A the client software utilizes two levels of redirection: there is a video redirector 108 and an NOS redirector 109.

In FIG. 5B an alternate form of software for using a client is illustrated. In FIG. 5B, the digital video control software 102 directly accesses the video services interface software 106. Thus, the video redirector 108 is omitted and there is only a single level of redirection in the form of the NOS redirector 109.

Clients access digital video data from the video server 50 based on the stream concept. As indicated above, a stream is based on an ordered byte sequence with the following characteristics: (i) a stream data flow has a rather high but relatively constant rate, (ii) stream data is accessed sequentially, and (iii) stream data must be delivered in a timely fashion (hence the continuity requirements). The communication between the clients and the server is as follows. A stream connection is used to deliver data for each movie track. A movie may have more than one track and hence more than one stream associated with it. To access and/or modify movie streams attributes, a client can send commends to the video server by issuing Remote Procedure Calls on a separate logical connection.

Finally, the above-described embodiments of the invention are intended to be illustrated only. Numerous alternative embodiments may be devised by those skilled in the art without departing from the scope of the following claims.

We claim:

1. A network for supporting both transactional data applications and full motion video applications comprising a transmission medium for transmitting data for said transactional data applications, at least one video server connected to said transmission medium, a plurality of clients connected to said transmission medium for transmitting software generated commands via said transmission medium to said video server to request that a particular full motion video stream be enabled to access the transmission medium, in response to said commands received from said clients, said video server controlling the transmission of multiple simultaneous full motion video streams of different content in said transmission medium so as to maintain the continuity of said plurality of full motion video, said full motion video streams of different content being transmittable in said transmission medium from one of said clients to said server and from said server to one of said clients, said video server including digital storage which serves as a source or destination for said video streams of different content and an interface for managing video I/O of said digital storage to maintain the continuity of said multiple simultaneous video streams of different content.

2. The network of claim 1 wherein a client accesses a full motion video stream from said video server by communicating with a data server, said data server then communicating with said video server to access said full motion video stream.

3. The network of claim 1 wherein said network further includes an interface for interfacing said video server with a wide area network to enable said wide area network to serve as a source or destination for one or more of said video streams.

4. The network of claim 1 wherein one of said clients comprises a system bus, a CPU connected to the system bus, a network interface connected to said bus for interfacing said client to said transmission medium and a video display in communication with said bus, a digital video control for managing video objects displayed on said display, an operating system, and a video services interface for translating video function calls into remote procedure calls for transmission to said video server.

5. The network of claim 4 wherein said video services interface is accessed via said operating system and wherein said client includes a video redirector for separating requests for video services from transactional data file requests and for directing said requests for video services to said video services interface, and a network operating system redirector for receiving said transactional data file requests, and for directing said transactional data file requests to a local file system located at the client or to said data file server.

6. The network of claim 4 wherein said digital video control directly accesses said video services interface.

7. The network of claim 1 wherein one of said video streams in said network is generated from a live feed received at said video server or at one of said clients.

8. In a network for supporting transactional data applications and full motion video applications, said network comprising a transmission medium for transmitting data for said transactional data applications, and a plurality of clients connected to said transmission medium, a video server connected to said transmission medium for supporting multiple simultaneous full motion video streams of different content transmitted in said network via said transmission medium from said server to said clients and from said clients to said server, said video server comprising:

means for receiving remote procedure calls related to said video streams via said transmission medium from said clients, means for controlling the admission of new full motion video streams into said network, means for maintaining the state of each stream and for controlling operations on each stream in response to stream attributes and for modifying the value of stream attributes in response to said remote procedure calls received via said transmission medium from said clients, a memory manager for managing a local memory contained in said server, a disk memory serving as a source for particular ones of said full motion video streams transmitted to said clients and a destination for particular ones of said video streams transmitted from said clients, a disk I/O interface for managing video I/O between said disk memory and said local memory to optimize the number of streams while maintaining the continuity of each stream, and an interface for interfacing said video server with said transmission medium.

9. A video interface system comprising a bus, a first wide area network interface connected to said bus and connected to a wide area network for enabling full motion video streams to be transferred from said wide area network to said interface system and from said interface system to said wide area network, a second local area network interface connected to said bus and to a local area network for enabling full motion video streams to be transferred from said local area network to said interface system and to said local area network from said interface system, a central processing unit for controlling the transfer of full motion video streams via said bus between said interfaces so that video streams can be transferred to said local area network from said wide area network and to said wide area network from said local area network, said local area network comprising a transmission medium to which said local area network interface is connected and a plurality of clients connected to said transmission medium, said local area network including a video server connected to the transmission medium for controlling multiple simultaneous full motion video streams of different content in said local area network including video streams transmitted to said local area network from said wide area network and from said local area network to said wide area network via said interface system in response to commands transmitted by said clients via said transmission medium of said local area network to said server.

10. The interface of claim 9 wherein said first and second interfaces form part of said video server.

11. A network for supporting data applications and full motion video applications comprising a video server for supporting full motion video applications in said network, a plurality of clients for transmitting commands to said video server to request that a particular full motion video stream be enabled to be transmitted via said network, said video server, in response to said commands received from said clients, enabling multiple simultaneous full motion video streams of different content to be transmitted via said network to and from particular ones of said clients, particular ones of said video streams transmitted from one of said clients to said server being stored at said server in digital form.

12. The network of claim 11 wherein said video server maintains the continuity of multiple simultaneous video streams being transmitted via said network.

13. The network of claim 11 wherein a client transmits a command to said video server by first transmitting the command to a data file server, said data file server then transmitting the command to said video server.

14. The network of claim 11 wherein one of said video streams transmitted via said network is generated from a live video feed received at said video server or at one of said clients.

15. The network of claim 11 wherein said network is a local area network.

16. The network of claim 15 further including an interface with a wide area network.

* * * * *